United States Patent [19]
Skaggs et al.

[11] Patent Number: 6,087,440
[45] Date of Patent: Jul. 11, 2000

[54] CONTINUOUS PROCESS FOR PREPARING A POLYURETHANE LATEX

[75] Inventors: Kenneth W. Skaggs, Lake Jackson; Rick L. Tabor, Missouri City, both of Tex.; Paul T. Louks, Saginaw, Mich.; Wayne R. Willkomm, Lake Jackson, Tex.

[73] Assignee: The Dow Chemical Company, Midland, Mich.

[21] Appl. No.: 09/250,640

[22] Filed: Feb. 16, 1999

[51] Int. Cl.$^7$ ............................... C08J 3/00; C08K 3/20; C08L 75/00

[52] U.S. Cl. .................... 524/839; 523/315; 524/591; 524/840

[58] Field of Search .................. 524/591, 839, 524/840; 523/335, 315

[56] References Cited

U.S. PATENT DOCUMENTS

| | | |
|---|---|---|
| 3,178,310 | 4/1965 | Berger et al. . |
| 3,294,724 | 12/1966 | Axelrood et al. . |
| 3,410,817 | 11/1968 | McClellan, Jr. et al. . |
| 3,919,173 | 11/1975 | Coyner et al. . |
| 4,269,748 | 5/1981 | Nachtkamp et al. . |
| 4,442,259 | 4/1984 | Isgur et al. . |
| 4,444,976 | 4/1984 | Rabito . |
| 4,742,095 | 5/1988 | Markusch et al. . |
| 4,879,322 | 11/1989 | Markusch et al. . |
| 4,921,842 | 5/1990 | Henning et al. . |
| 5,041,467 | 8/1991 | Katohka et al. . |
| 5,043,381 | 8/1991 | Coogan et al. . |
| 5,124,073 | 6/1992 | Goffing et al. . |
| 5,169,895 | 12/1992 | Coogan et al. . |
| 5,221,710 | 6/1993 | Markusch et al. . |
| 5,389,720 | 2/1995 | Markusch et al. . |
| 5,432,228 | 7/1995 | Hilken et al. . |
| 5,527,853 | 6/1996 | Landy et al. . |
| 5,539,021 | 7/1996 | Pate et al. . |
| 5,576,382 | 11/1996 | Seneker et al. . |
| 5,583,176 | 12/1996 | Haberle . |
| 5,688,842 | 11/1997 | Pate, III et al. . |
| 5,717,024 | 2/1998 | Kukkala et al. . |
| 5,959,027 | 9/1999 | Jakubowski et al. ............ 524/839 |

FOREIGN PATENT DOCUMENTS

| | | |
|---|---|---|
| 0 601 764 B1 | 6/1994 | European Pat. Off. . |
| 0 794 203 A2 | 9/1997 | European Pat. Off. . |
| 1 432 112 | 4/1976 | United Kingdom . |

OTHER PUBLICATIONS

Hansen, C. M., J. Paint Technol., vol. 39, No. 511, pp. 505–510 (Aug. 1967).

*Primary Examiner*—Patrick D. Niland
*Attorney, Agent, or Firm*—Reid S. Willis

[57] ABSTRACT

A polyurethane/urea/thiourea latex having a narrow molecular weight polydispersity and sub-micron particle size can be prepared by first preparing a high solids (between about 65% and 74% solids) latex of a polyurethane/urea/thiourea prepolymer, then contacting the emulsion with a chain-extending reagent under such conditions to form the polymer latex.

11 Claims, No Drawings

CONTINUOUS PROCESS FOR PREPARING A POLYURETHANE LATEX

BACKGROUND OF THE INVENTION

This invention relates to polyurethane/urea/thiourea latexes prepared from a urethane/urea/thiourea prepolymer.

Polyurethane/urea/thiourea latexes are generally prepared by chain extending the reaction product of an organic diisocyanate and an organic compound having two active hydrogen atoms such as polyalkylene ether glycols, poly(alkylene ether-alkylene thioether) glycols, alkyd resins, polyesters and polyester amides. The diisocyanate is used in stoichiometric excess so that the reaction product, also referred to as a polyurethane/urea/thiourea prepolymer, is isocyanate terminated. The prepolymer is typically prepared in the presence of a solvent. Examples of polyurethane prepolymer preparations are described in U.S. Pat. Nos. 3,178,310; 3,919,173; 4,442,259; 4,444,976; and 4,742,095, inter alia.

U.S. Pat. No. 3,294,724 discloses the preparation of a film-forming urethane latex by chain extending the isocyanate-terminated prepolymer with a piperazine compound. First, the prepolymer is prepared by reacting a polyalkylene ether glycol with a diisocyanate. A prepolymer emulsion is then formed, whereupon a piperazine compound dissolved in cold water is added to the emulsion with stirring to form a stable chain-extended latex. A solvent such as toluene or cyclohexanone is used either in the step to form the prepolymer or in the chain extension step.

The solids content of a typical polyurethane latex tends to be in the range of about 30 to 40 weight percent. For example, U.S. Pat. No. 4,742,095 describes the preparation of a polyurethane latex having a solids content of as high as 41 weight percent. To minimize transport costs and drying times, it is desirable to prepare a polyurethane latex that maximizes solids content without having to resort to additional concentration means such as evaporation of water.

It would be advantageous to prepare a polyurethane/urea/thiourea latex in the substantial absence of any ancillary organic solvents. It would be further advantageous to prepare such a latex having a high solids content, with controlled particle size, and a narrow particle size distribution. Finally, it would be desirable to prepare a polyurethane latex from less expensive raw materials such as aromatic diisocyanates. Such a latex would be particularly useful as a carpet backing.

SUMMARY OF THE INVENTION

In one aspect, the present invention is a process for preparing a polyurethane/urea/thiourea latex comprising the steps of: a) continuously merging in the presence of an emulsifying and stabilizing amount of a surfactant a first stream containing water flowing at a rate $r_1$, together with a second stream containing a polyurethane/urea/thiourea prepolymer flowing at a rate $r_2$, to form a polyurethane/urea/thiourea latex prepolymer; and b) contacting the latex prepolymer with a chain-extending reagent under such conditions to form a polyurethane/urea/thiourea latex, wherein the ratio of $r_2$:$r_1$ is not less than 65:35 and less than a ratio required to make a water-continuous HIPR emulsion.

DETAILED DESCRIPTION OF THE INVENTION

The polyurethane/urea/thiourea latex of the present invention can be prepared by first merging, in the presence of a stabilizing amount of a surfactant, a first stream containing water and flowing at a rate $r_1$, with a second stream containing a polyurethane/urea/thiourea prepolymer and flowing at a rate $r_2$, wherein the ratio of $r_2$:$r_1$ is not less than 65:35, preferably not less than 70:30, and less than the ratio required to make a water-continuous phase HIPR emulsion (i.e., about 74:26), to form a high solids content latex prepolymer. The latex prepolymer is then contacted with a chain-extending reagent under such conditions to form a polyurethane/urea/thiourea latex.

The polyurethane/urea/thiourea prepolymer can be prepared by any suitable method such as those well known in the art. The prepolymer is preferably prepared by contacting a high molecular weight organic compound having at least two active hydrogen atoms with sufficient polyisocyanate, and under such conditions to ensure that the prepolymer is terminated with at least two isocyanate groups. The stream containing the prepolymer may also contain a small percentage, preferably less than 20 mole percent, of a prepolymer that is terminated by only one isocyanate group.

The polyisocyanate is preferably an organic diisocyanate, and may be aromatic, aliphatic, or cycloaliphatic, or a combination thereof. Representative examples of diisocyanates suitable for the preparation of the prepolymer include those disclosed in U.S. Pat. No. 3,294,724, column 1, lines 55 to 72, and column 2, lines 1 to 9, incorporated herein by reference, as well as U.S. Pat. No. 3,410,817, column 2, lines 62 to 72, and column 3, lines 1 to 24, also incorporated herein by reference. Preferred diisocyanates include 4,4'-diisocyanatodiphenylmethane, 2,4'-diisocyanatodiphenylmethane, isophorone diisocyanate, p-phenylene diisocyanate, 2,6-toluene diisocyanate, polyphenyl polymethylene polyisocyanate, 1,3-bis(isocyanatomethyl)cyclohexane, 1,4-diisocyanatocyclohexane, hexamethylene diisocyanate, 1,5-naphthalene diisocyanate, 3,3'-dimethyl-4,4'-biphenyl diisocyanate, 4,4'-diisocyanatodicyclohexylmethane, 2,4'-diisocyanatodicyclohexylmethane, and 2,4-toluene diisocyanate, or combinations thereof. More preferred diisocyanates are 4,4'-diisocyanatodicyclohexylmethane, 4,4'-diisocyanatodiphenylmethane, 2,4'-diisocyanatodicyclohexylmethane, and 2,4'-diisocyanatodiphenylmethane. Most preferred is 4,4'-diisocyanatodiphenylmethane and 2,4'-diisocyanatodiphenylmethane.

As used herein, the term "active hydrogen group" refers to a group that reacts with an isocyanate group to form a urea group, a thiourea group, or a urethane group as illustrated by the general reaction:

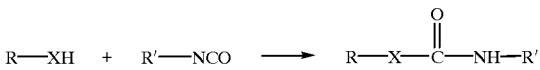

where X is O, S, NH, or N, and R and R' are connecting groups which may be aliphatic, aromatic, or cycloaliphatic, or combinations thereof. The high molecular weight organic compound with at least two active hydrogen atoms has a molecular weight of not less than 500 Daltons.

The high molecular weight organic compound having at least two active hydrogen atoms may be a polyol, a polyamine, a polythiol, or a compound containing combinations of amines, thiols, and ethers. Preferably, the high molecular weight organic compound having at least two active hydrogen atoms is a diol, a diamine, a dithiol, an alcohol-amine, a thiol-amine, or an alcohol-thiol, and has a weight average molecular weight of not less than 500.

Preferably, the high molecular weight organic compound having at least two active hydrogen atoms is an amine-terminated polyol (commercially available as Jeffamine™ polyether amines from Huntsman Corp.) or a polyalkylene glycol ether or thioether or polyester polyol or polythiol having the general formula:

where each R is independently an alkylene radical; R' is an alkylene or an arylene radical; each X is independently S or O, preferably O; n is a positive integer; and n' is a non-negative integer, with the proviso that n and n' are sufficiently large that the compound has a weight average molecular weight of not less than about 500 Daltons, more preferably not less than about 750 Daltons, and most preferably not less than about 1000 Daltons. Preferably, the weight average molecular weight of the polyalkylene glycol is not greater than about 20,000 Daltons, more preferably not greater than about 10,000 Daltons, more preferably not greater than about 5000 Daltons, and most preferably not greater than about 3000 Daltons. The polyalkylene ether glycols and polyester polyols are preferred. Representative examples of polyalkylene ether glycols are polyethylene ether glycols, poly-1,2-propylene ether glycols, polytetramethylene ether glycols, poly-1,2-dimethylethylene ether glycols, poly-1,2-butylene ether glycol, and polydecamethylene ether glycols. Preferred polyester polyols include polybutylene adipate and polyethylene terephthalate.

A small amount of a low molecular compound with at least two active hydrogen atoms may be added along with the high molecular weight organic compound having at least two active hydrogen atoms to increase the tensile strength of the resulting polymer. The molecular weight of the low molecular compound having at least two active hydrogen atoms is in the range of from about 62 Daltons to about 400 Daltons, and includes diols, dithiols, diamines, alcohol amines, alcohol thiols, and amine thiols. Diols including diethylene glycol, ethylene glycol, and dipropylene glycol are preferred. The amount of low molecular weight organic compound is preferably added in a sufficient amount to advantageously increase the tensile strength of the resulting polymer. More preferably, the amount of low molecular organic compound having at least two active hydrogen atoms is not less than 0.5 weight percent, most preferably not less than 1 weight percent based on the weight of the total compounds having active hydrogen atoms; and more preferably not greater than 10 weight percent, most preferably not greater than 5 weight percent based on the weight of the total compounds having active hydrogen atoms.

Preferably, the NCO:XH ratio, where X is O or S, preferably O, is not less than 1.1:1, more preferably not less than 1.2:1, and preferably not greater than 5:1.

The polyurethane prepolymer can be prepared by a batch, or a continuous process by methods such as those well known in the art. For example, a stoichiometric excess of a diisocyanate and a polyol can be introduced in separate streams into a static or an active mixer, preferably in the presence of an activating amount of an organotin catalyst such as stannous octoate, and at a temperature suitable for controlled reaction of the reagents, typically from about 40° C. to about 100° C. The reaction is carried to substantial completion in a plug flow reactor to form the prepolymer.

The surfactant is sometimes used as a concentrate in water. In this case, a stream containing the surfactant is advantageously first merged with the stream containing the prepolymer to form a prepolymer/surfactant mixture. Although a prepolymer latex can be prepared in this single step, it is preferred that a stream containing the prepolymer and the surfactant be merged with a water stream to dilute the surfactant and to create the prepolymer latex.

When the surfactant is 3 percent by weight DeSULF™ DBS-60T surfactant (active ingredient is triethanolamine dodecylbenzene sulfonate, a trademark of DeForest Enterprise, Inc.) the preferred $r_2:r_1$ is from about 3.5:1 to about 6:1 when an IKA SD 41 Super Dispax™ disperser (IKA WORKS, Inc.) and about 2:1 to about 4:1 when an IKA DR 3-9 P is used.

An external surfactant, which may be cationic, anionic, or nonionic, is preferably used to prepare the HIPR emulsion. Suitable classes of surfactants include, but are not restricted to, sulfates of ethoxylated phenols such as poly(oxy-1,2-ethanediyl)α-sulfo-ω(nonylphenoxy) ammonium salt; alkali metal fatty acid salts such as alkali metal oleates and stearates; polyoxyalkylene nonionics such as polyethylene oxide, polypropylene oxide, polybutylene oxide, and copolymers thereof; alcohol alkoxylates; ethoxylated fatty acid esters and alkylphenol ethoxylates; alkali metal lauryl sulfates; amine lauryl sulfates such as triethanolamine lauryl sulfate; quaternary ammonium surfactants; alkali metal alkylbenzene sulfonates such as branched and linear sodium dodecylbenzene sulfonates; amine alkyl benzene sulfonates such as triethanolamine dodecylbenzene sulfonate; anionic and nonionic fluorocarbon surfactants such as fluorinated alkyl esters and alkali metal perfluoroalkyl sulfonates; organosilicon surfactants such as modified polydimethylsiloxanes; and alkali metal soaps of modified resins. If the prepolymer is self-emulsifying by inclusion of emulsifying nonionic, cationic, or anionic groups, then an external surfactant may or may not be necessary.

Generally, higher surfactant concentrations result in smaller diameter particles, but surfactant concentrations that are too high tend to deleteriously affect the properties of products such as films prepared from the HIPR emulsion. A person of ordinary skill in the art can readily determine the appropriate surfactant concentration for the particular end use.

Although it is possible to first dissolve the prepolymer in a solvent for the prepolymer prior to forming the HIPR emulsion, it is preferred to prepare the HIPR emulsion in the substantial absence of a solvent, more preferably in the absence of a solvent. As used herein, the term "in the substantial absence of a solvent" means that a solvent for the prepolymer represents not more than 10 weight percent, preferably not more than 5 weight percent, more preferably not more than 1 weight percent, and most preferably not more than 0.1 weight percent of the HIPR emulsion based on the weight of the prepolymer and the solvent.

The inclusion of a solvent often adds an unnecessary expense to the manufacture of the end-use product. Moreover, solvent removal, when necessary to obtain acceptable physical properties of the product, is also an expensive as well as a time-consuming step. Thus, a preferred process of the present invention represents an advance in the art of the preparation of urethane latexes.

It is also possible, and may be desirable in some instances, to form a prepolymer latex that is not prepared by diluting an HIPR emulsion, but rather by diluting a prepolymer latex concentrate that has an oil:water ratio that is outside the theoretical lower limit of the HIPR emulsion, and higher than the ratio of oil:water ratio of the subsequently prepared prepolymer latex. It has surprisingly been discovered that when a large diameter disperser (>60 mm) is used, the preferred ratio $r_2:r_1$, wherein $r_1$ and $r_2$ are each measured in units of mass/unit time, is not less than about 2.0:1, more preferably not less than 2.3:1, and most preferably not less than 2.5:1, and less than 4.0:1. Such ratios, then, would include latex concentrates that are not HIPR emulsions since the HIPR emulsions require a disperse phase to continuous phase ratio of at least 74:26.

A polyurethane/urea/thiourea polymer can be prepared by contacting the prepolymer with a chain-extending reagent, which is a compound that contains functional groups that react with isocyanate groups to form urethane, urea, or thiourea groups. Chain-extending reagents are well known in the art.

The HIPR emulsion or prepolymer latex concentrate is preferably diluted with sufficient amounts of water to form a prepolymer latex having a disperse phase to aqueous phase ratio that is less than about 3:1, more preferably less than 2.5:1. Although water can be used as a chain-extending agent, other chain-extending agents such as aliphatic, cycloaliphatic, aromatic polyamines, and alcohol amines, are preferred for building of molecular weight. Therefore, it is preferred that the prepolymer latex be contacted with the preferred chain-extending reagent before substantial reaction takes place between water and the prepolymer, and it may be desirable to dilute the HIPR emulsion or prepolymer latex concentrate with a solution containing water and the preferred chain-extending reagent, or water and concomitant addition of the preferred chain-extending reagent.

More preferred chain-extending reagents are alcohol monoamines such as monoethanol amine and diethanol amine, and diamines including hydrazine, ethylene diamine, propylene-1,2-diamine, propylene-1,3-diamine, tetramethylenediamine, hexamethylenediamine, 4,4'-dimethylamino-3,3'-dimethyldiphenylmethane, 4,4'-diamino-diphenylmethane, 2,4-diaminotoluene, 2,6-diaminotoluene, aminoethylethanolamine, and piperazine. Water-soluble diamines are most preferred. Piperazine is an example of a most preferred chain-extending agent.

The chain-extending reagent is preferably the limiting reagent because it is desirable to avoid residual chain-extending reagent, particularly diamine, in the final latex. Thus, in a preferred method of preparing the polyurethane/urea/thiourea latex, an aqueous solution of a diamine is contacted with a stoichiometric excess of a latex of the prepolymer (that is, a stoichiometric excess of isocyanate groups). After the diamine is substantially completely reacted, the resultant latex is preferably allowed to stand for a sufficiently long time so that the remaining isocyanate groups react with the water. The preferred latex is a polyurethane/urea latex having a volume average particle size of not greater than about 1 micron, more preferably not greater than about 0.5 micron, and most preferably not greater than about 0.4 micron, with a polydispersity that is preferably not greater than about 2, more preferably not greater than about 1.5, and most preferably not greater than about 1.3.

It has been surprisingly discovered that the volume average particle size and polydispersity of a final polyurethane/urea/thiourea latex prepared from an HIPR emulsion of a polyurethane/urea/thiourea prepolymer by the process of the present invention is generally less than the particle size and polydispersity of a polyurethane/urea/thiourea latex not prepared from an HIPR emulsion of a polyurethane/urea/thiourea prepolymer, for a given surfactant, and at a given concentration of the surfactant.

It is further surprising that a polyurethane latex with high solids content that is at least 45 percent by weight, preferably at least 50 percent by weight, more preferably at least 55 percent by weight, based on the weight of the latex, can be prepared by the process of the present invention. This high solids latex can be prepared without resorting to costly removal of water from a more dilute latex.

The polyurethane/urea/thiourea latexes of the present invention are useful for applications for latexes with controlled particle size and narrow size distributions are especially important. Such applications include films, floor coatings, and adhesives, especially for carpet-backing applications.

The following example is for illustrative purposes only and is not intended to limit the scope of this invention. All percentages are in weight percent unless otherwise stated.

EXAMPLE
Preparation of a High Solids Content Polyurethane Latex

The prepolymer was prepared by combining VORANOL™ 5287 polyol (63.35 percent by weight, a trademark of The Dow Chemical Company), ISONATE™ 50 MDI (33.3 percent by weight, a trademark of The Dow Chemical Company), diethylene glycol (1.35 percent by weight) and polyethylene oxide monol having a molecular weight of 950 (2 percent by weight).

The prepolymer was fed continuously at a rate of 5.94 kg/min through a first arm fitted to a first T. DeSULF™ DBS60T surfactant (a 60 percent aqueous solution of triethanolamine dodecylbenzene sulfonate, a trademark of DeForest Enterprises, Inc.) was fed at a rate of 0.57 kg/min through a first arm of a second T and merged with a water stream flowing at a rate of 2.1 kg/min through a second arm of the second T. The water/surfactant stream was then passed through a second arm of the first T and merged with the prepolymer. The merged water/surfactant/prepolymer stream was then passed through a static mixer and then fed to the input port of an IKA DR 3-9/P DISPAX™ REACTOR rotor stator instrument (a trademark of IKA WORKS, Inc.) operating at 2560 rpm.

The ratio of the feeds into the dispersing instrument were 69 weight percent prepolymer, 6.6 weight percent surfactant solution, and 24.4 weight percent water. The weight ratio of the aqueous to organic streams (including surfactant) was 0.371, and the volume ratio was 0.395. Weight:weight ratio was calculated as follows:

Organic=PU prepolymer feed rate+0.6×(surfactant solution feed rate)

=5.94+0.6×0.57=6.282

Aqueous=Water stream feed rate+0.4×(surfactant solution feed rate)

=2.1+0.4×0.57=2.328

Aq/Org=2.328/6.282=0.37

Volume ratios were measured by first determining the densities of the streams at the appropriate temperatures and converting the mass flows to volume flows.

Chain extension was accomplished using a LIGHTNIN™ 33DS-1500 mixer drive (a trademark of GREEY/LIGHNIN) fitted to agitators in an in-line mixing vessel. The latex concentrate from the dispersing instrument was fed into a first arm attached to a third T and merged with a 10 weight percent aqueous piperazine solution fed through a second arm of the third T at the rate of 3.54 kg/min (0.8 equivalents, based on the isocyanate groups of the prepolymer). The output of the combined streams was fed directly into the in-line blender operating at 350 rpm. The product was collected in a 4000-gallon (15000-liter) vessel to allow water to react with remaining isocyanate groups. The resulting stable poly(urethane/urea) latex was found to have a solids content of 53.8 percent by weight, a volume average particle size of 0.344 micron, with all particles being less than 1.149 microns, as measured by a Coulter LS 230 particle analyzer.

What is claimed is:

1. A process for preparing a high solids content polyurethane/urea/thiourea latex comprising the steps of:
   a) continuously merging in the presence of an emulsifying and stabilizing amount of a surfactant a first stream containing water flowing at a rate $r_1$, together with a second stream containing a polyurethane/urea/thiourea prepolymer flowing at a rate $r_2$, to form a polyurethane/urea/thiourea latex prepolymer; and
   b) contacting the latex prepolymer with a chain-extending reagent under such conditions to form a polyurethane/urea/thiourea latex;
      wherein the ratio of $r_2:r_1$ is not less than 65:35 and less than a ratio required to make a water-continuous HIPR emulsion.

2. The process of claim 1 wherein the polyurethane/urea/thiourea prepolymer is a polyurethane prepolymer or a polyurethane/urea prepolymer and wherein the prepolymer is prepared by contacting a high molecular weight organic compound having at least two active hydrogen atoms with sufficient polyisocyanate, and under such conditions to ensure that the prepolymer is terminated with at least two isocyanate groups.

3. The process of claim 2 wherein the polyurethane prepolymer is prepared by contacting a stoichiometric excess of a polyisocyanate with an amine-terminated polyol or a polyalkylene glycol ether or a polyester polyol, wherein the polyalkylene glycol is a polyethylene ether glycol, a poly-1,2-propylene ether glycol, a polytetramethylene ether glycol, a poly-1,2-dimethylethylene ether glycol, a poly-1,2-butylene ether glycol, or a polydecamethylene ether glycol, or a combination thereof, and wherein the polyester polyol is a polyethylene terephthalate or a polybutylene adipate.

4. The process of claim 3 wherein the polyisocyanate is 4,4'-diisocyanatodiphenylmethane, 2,4'-diisocyanatodiphenylmethane, p-phenylene diisocyanate, 2,6-toluene diisocyanate, polyphenyl polymethylene polyisocyanate, 1,3-bis(isocyanatomethyl)cyclohexane, 1,4-diisocyanatocyclohexane, hexamethylene diisocyanate, 1,5-naphthalene diisocyanate, 3,3'-dimethyl-4,4'-biphenyl diisocyanate, 4,4'-diisocyanatodicyclohexylmethane, 2,4'-diisocyanatodicyclohexylmethane, isophorone diisocyanate, or 2,4-toluene diisocyanate, or a combination thereof.

5. The process of claim 4 wherein the surfactant is a sulfate of an ethoxylated phenol, an alkali metal alkylbenzene sulfonate, an amine alkylbenzene sulfonate, an alkali metal lauryl sulfate, an amine lauryl sulfate, a polyoxyalkylene, an alkylphenol ethoxylate, or a quaternary ammonium surfactant, or a combination thereof, and the diisocyanate is 4,4'-diisocyanatodicyclohexyl methane, 2,4'-diisocyanatodicyclohcxylmethane, or a mixture thereof.

6. The process of claim 1 wherein the chain-extending reagent contains water and the second stream contains a polyurethane/urea/thiourea prepolymer that is terminated with only one isocyanate group.

7. The process of claim 6 wherein the chain-extending reagent contains monoethanol amine, diethanol amine, hydrazine, aminoethylethanolamine, ethylene diamine, propylene-1,2-diamine, propylene-1,3-diamine, tetramethylenediamine, hexamethylenediamine, 4,4'-dimethylamino-3,3'-dimethyldiphenylmethane, 4,4'-diamino-diphenylmethane, 2,4-diaminotoluene, 2,6-diaminotoluene, or piperazine, or a combination thereof.

8. The process of claim 7 wherein the chain-extending reagent is an aqueous solution of piperazine.

9. A process for preparing a high solids content polyurethane/urea/thiourea latex comprising the steps of:
   a) continuously merging in the presence of an emulsifying and stabilizing amount of a surfactant a first stream containing water flowing at a rate $r_1$, together with a second stream containing a polyurethane/urea/thiourea prepolymer flowing at a rate $r_2$, to form a polyurethane/urea/thiourea latex prepolymer; and
   b) contacting the latex prepolymer with a chain-extending reagent under such conditions to form a polyurethane/urea/thiourea latex;
      wherein the ratio of $r_2:r_1$ is not less than 65:35 and less than a ratio required to make a water-continuous HIPR emulsion, and wherein the prepolymer is prepared from an aromatic diisocyanate.

10. The process of claim 9 wherein the resultant polyurethane/urea/thiourea latex has volume average particle size of less than 1 micron.

11. The process of claim 9 wherein the ratio of $r_2:r_1$ is not less than 70:30.

* * * * *